(12) United States Patent
Jennings, III et al.

(10) Patent No.: US 7,523,193 B2
(45) Date of Patent: Apr. 21, 2009

(54) METHOD AND APPARATUS FOR DNS PRE-FETCHING FOR MULTIPLE CLIENTS

(75) Inventors: Raymond B. Jennings, III, Ossining, NY (US); Jason D. LaVoie, Mahopac, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 10/848,031

(22) Filed: May 18, 2004

(65) Prior Publication Data
US 2005/0262248 A1 Nov. 24, 2005

(51) Int. Cl.
*G06F 15/173* (2006.01)
*G06F 15/16* (2006.01)

(52) U.S. Cl. ...................................... 709/224; 709/245
(58) Field of Classification Search .................. 709/224, 709/238, 245
See application file for complete search history.

(56) References Cited

U.S. PATENT DOCUMENTS 6,016,512 A * 1/2000 Huitema ..................... 709/245
6,606,645 B1 * 8/2003 Cohen et al. ................ 709/203
2004/0205149 A1 * 10/2004 Dillon et al. ................ 709/217
2005/0240574 A1 * 10/2005 Challenger et al. ............. 707/3

OTHER PUBLICATIONS

Shin, Seung Won et al, "Improving World-Wide-Web Performance Using Domain-Top approach to Prefetching", 2000, IEEE Computer Society, Proceedings of The Fourth International Conference on High-Performance Computing in the Asia-Pacific Region, vol. 2, pp. 738-746.*

* cited by examiner

*Primary Examiner*—Larry D Donaghue
*Assistant Examiner*—Brian J Gillis

(57) ABSTRACT

In one embodiment, the present invention is a method and apparatus for DNS pre-fetching for multiple clients. In one embodiment, all packets coming into or going out of a local network are scanned for application protocol, domain names, and/or other information. If pre-defined criteria indicate that the network is interested in a particular domain name, a DNS lookup is performed and the corresponding IP address is cached by the local DNS server. The local DNS server is thereby able to quickly respond to future requests for the cached domain name. Moreover, because the IP address is cached at the local DNS server, any client connected to the local DNS server on the local network can request the cached domain name from the local DNS server and be quickly connected to the indicated domain name.

14 Claims, 5 Drawing Sheets

METHOD AND APPARATUS FOR DNS PRE-FETCHING FOR MULTIPLE CLIENTS

BACKGROUND

The present invention relates generally to network processing, and relates more particularly to the pre-fetching of local Domain Name System (DNS) entries. Specifically, the invention is a method and apparatus for DNS pre-fetching for multiple clients.

FIG. 1 is a schematic diagram illustrating a typical computing network 100. Network 100 comprises a local area network (LAN) 102 interfaced to a global internet 104. Connected to the LAN 102 are a plurality of clients $106_1$-$106_n$ (hereinafter collectively referred to as "clients 106") that request data (e.g., content) from the internet 104.

When a client 106 requests content from the internet 104, it does so by requesting a specific domain name of a server on the network 100 (e.g., by entering the domain name in a web browser). A DNS server then identifies a corresponding IP address, enabling the client 106 to connect to the appropriate server. Typically, DNS systems comprise a hierarchy of DNS servers, the bottom level of which is a zone's name server 110. If the name server 110 does not know the IP address of the requested domain name, the name server 110 directs the client to the next server higher in the DNS hierarchy. The process continues through the hierarchy until a server that can convert the domain name to the corresponding IP address is contacted. Some clients 106 may contain a local, self-serving DNS server integrated with the client, while some networks 102 may possess a local DNS server 108. If either of these is used, they receive the DNS request before it is sent to the name server.

To expedite the process of converting domain names, some existing systems include a DNS pre-fetch mechanism (e.g., within web browsers and proxies) that recognizes domain names when hypertext markup language (HTML) is rendered. Each recognized domain name's DNS entry is then pre-fetched, or placed in the local DNS server 108, which later reduces the time necessary to connect to the host corresponding to the domain name. A drawback of such processes, however, is that they only work for a single application protocol (i.e., HTTP), and they require client-side software modifications, which prevents sharing of pre-fetched entries among multiple clients.

Thus, there is a need in the art for a method and apparatus for DNS pre-fetching for multiple clients.

SUMMARY OF THE INVENTION

In one embodiment, the present invention is a method and apparatus for DNS pre-fetching for multiple clients. In one embodiment, all packets coming into or going out of a local network are scanned for application protocol, domain names, and/or other information. If pre-defined criteria indicate that the network is interested in a particular domain name, a DNS lookup is performed and the corresponding IP address is cached by the local DNS server. The local DNS server is thereby able to quickly respond to future requests for the cached domain name. Moreover, because the IP address is cached at the local DNS server, any client connected to the local DNS server on the local network can request the cached domain name from the local DNS server and be quickly connected to the indicated domain name.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for DNS pre-fetching for multiple clients. The method enables a local DNS server to quickly respond to client requests for particular domain names. Moreover, because corresponding IP addresses are cached at the local DNS server, any client connected to the local DNS server on the local network can be quickly connected to the indicated domain name.

Figure 1:
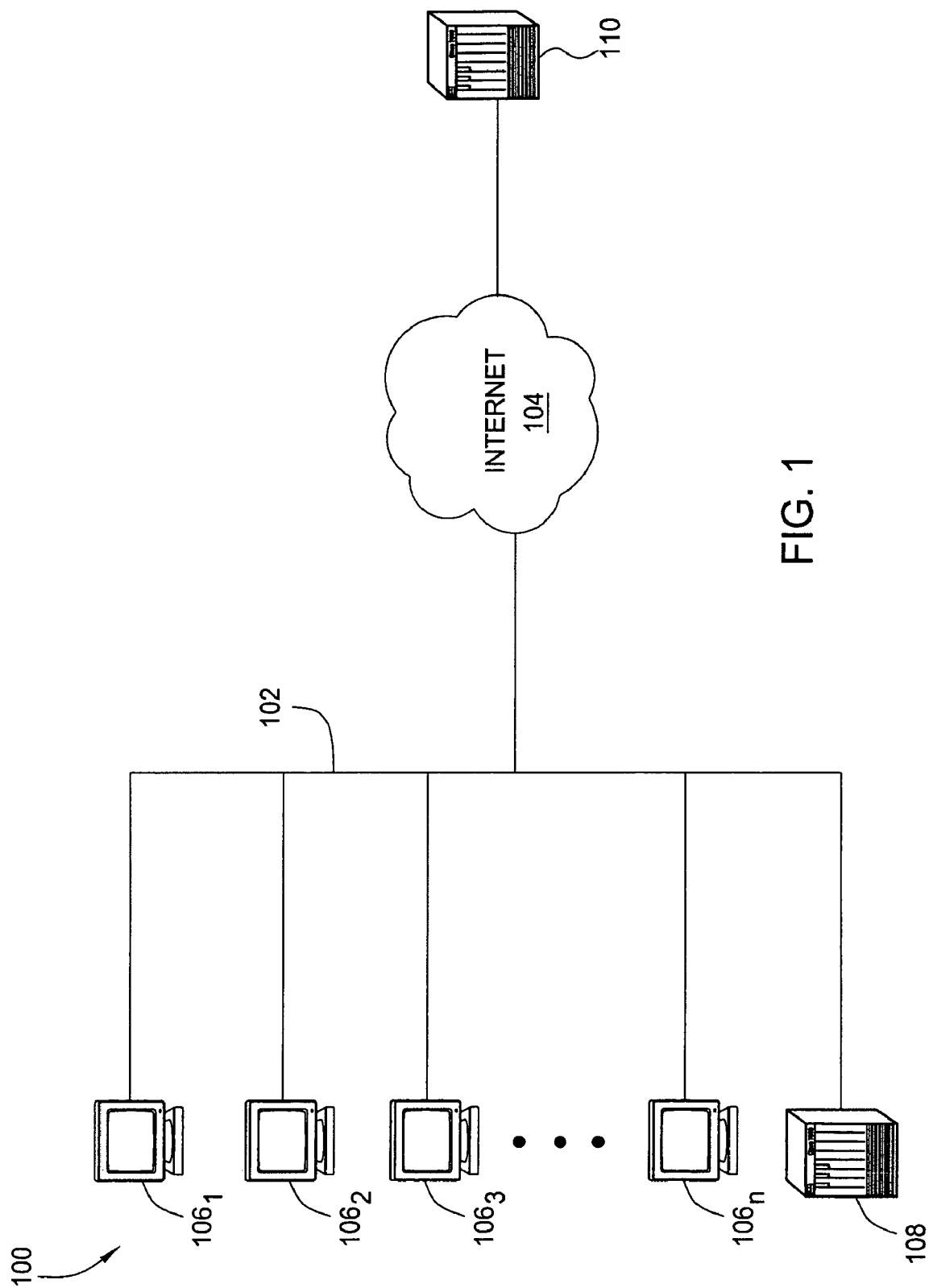
FIG. 1 is a schematic diagram illustrating a typical computing network.
Figure 2:
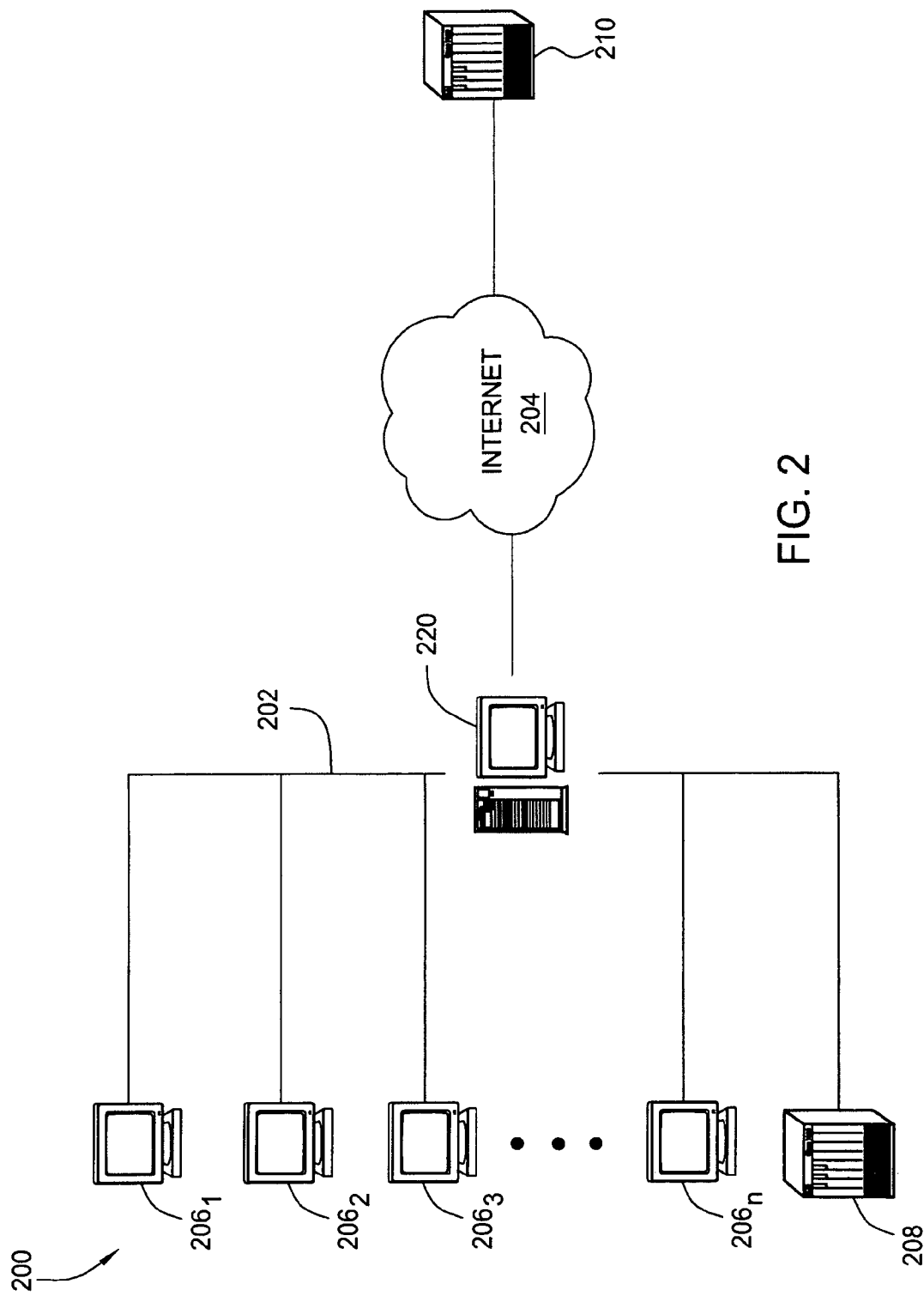
FIG. 2 is a schematic diagram illustrating a computing network, according to one embodiment of the present invention.

FIG. 2 is a schematic diagram illustrating a computing network 200, according to one embodiment of the present invention. The network 200 is substantially similar to the network 100 illustrated in FIG. 1 and is implemented as an internet. The network 200 comprises an internet 204 interfaced to at least one client $206_1$-$206_n$ (hereinafter collectively referred to as "clients 206") on a LAN 202. A plurality of DNS servers, including a name server 210, is also interfaced to the internet 204. In one embodiment, the network 200 further includes a local DNS server 208 on the LAN 202. Alternatively or in addition, each client 206 may include a local, self-serving DNS server (not shown). Thus, FIG. 2 is intended as an example, and not as an architectural limitation for the present invention.

In one embodiment, the network 200 further includes a packet monitor 220 that monitors all inbound and outbound traffic to the LAN 202 to the internet 204. In the embodiment illustrated, the packet monitor 220 is a dedicated machine that is adapted to run packet monitoring software. In alternative embodiments, any machine on the network 200 (e.g., clients, servers) may be adapted to include packet monitoring capabilities.

The packet monitor 220 is adapted to scan incoming and outgoing data packets, looking for application protocol, domain names, and other information. Network criteria, such as request history, gathered information, network policies and the like, will dictate whether information scanned by the packet monitor 220 is of interest to the network 200. As described in further detail in conjunction with FIGS. 3 and 4, the packet monitor is further adapted to issue local DNS requests to the local DNS server 208 when the packet monitor 220 identifies a domain name of interest, so that the DNS entry for the domain name may be pre-fetched for future use.

Figure 3:
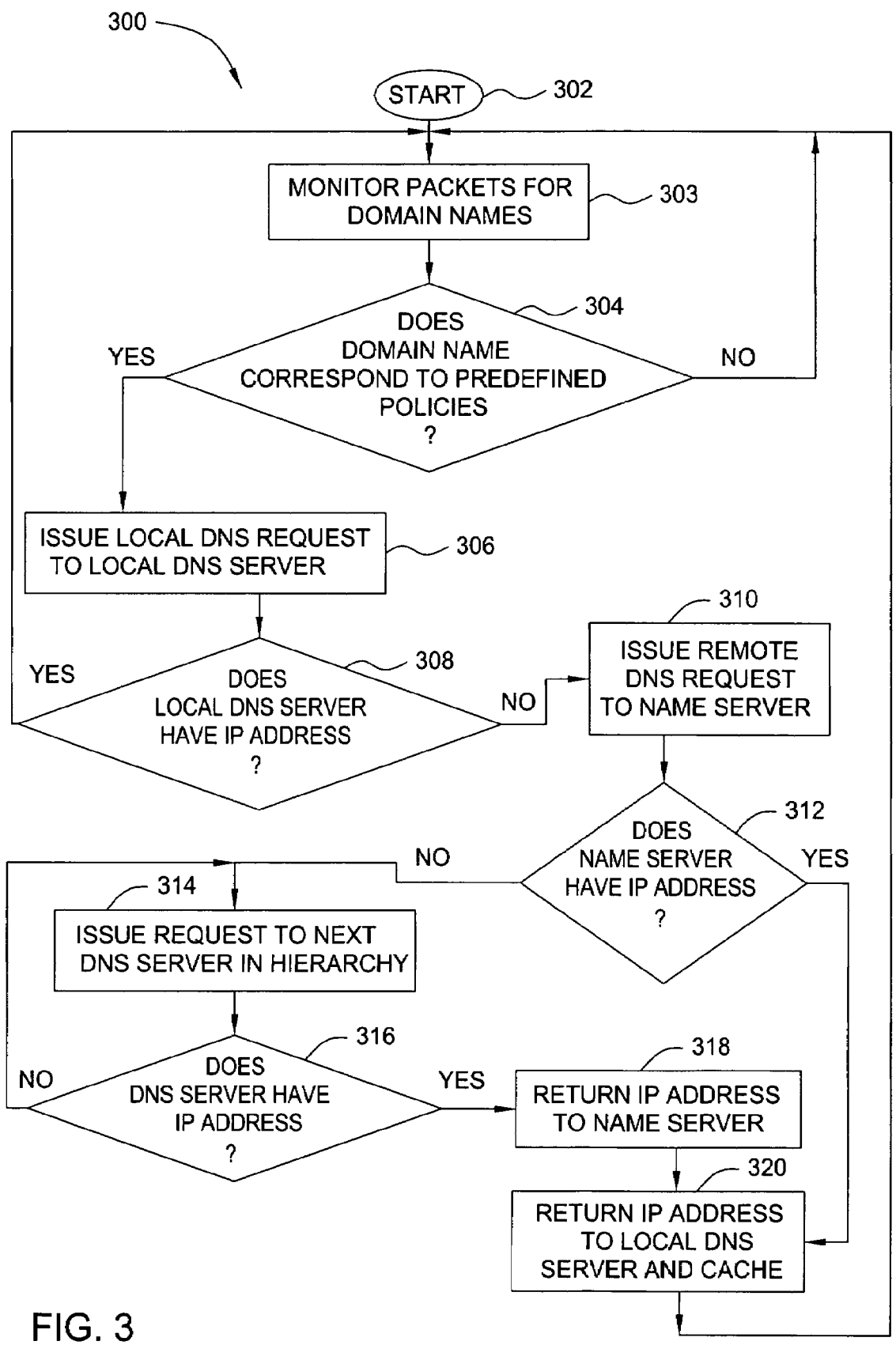
FIG. 3 is a flow diagram illustrating a method for responding to an HTTP GET request and for pre-fetching DNS entries, according to one embodiment of the present invention.

FIG. 3 is a flow diagram illustrating a method 300 for responding to a hypertext transfer protocol (HTTP) GET request and for pre-fetching DNS entries, according to one embodiment of the present invention. In one embodiment, HTTP GET requests are executed using a standard DNS protocol. In one embodiment, the method 300 monitors HTTP traffic coming into a local network from an internet (e.g., via a packet monitor such as packet monitor 220 of FIG. 2) in order to resolve a request from a client (e.g., a web browser) that wishes to retrieve content from a remote HTTP server specified in content of the monitored requests. The method 300 assumes that the client does not have the IP address of the remote HTTP server cached locally. Although the method 300 is described with reference to HTTP and hypertext markup language (HTML) protocols, those skilled in the art will appreciate that the method 300 may be implemented for use with any application level protocol that utilizes DNS. Moreover, a client in the context of the method 300 may be any machine that is on the network and that makes requests to a remote machine.

The method 300 is initialized at step 302 and proceeds to step 303, where the method 300 monitors incoming and outgoing packets for domain names in downstream HTML. In step 304, the method 300 inquires if a given domain name corresponds to pre-defined network policies. That is, the method 300 determines if a domain name is of interest, based on one or more parameters that may include, without limitation, the frequency of the domain name within a window of time or network packets (e.g., a domain name that is returned numerous times by a web search engine), the frequency or grouping of disparate domain names within a window of time or network packets (e.g., a list of domain names retrieved from a search engine), a transport layer identifier or endpoint (e.g., domain names found within packets that contains "TCP port 80"), the protocol being monitored (e.g., HTTP), the IP address of the requesting client (e.g., a local web crawler that will need to resolve any domain names it receives), the IP address or name of a responding entity, (e.g., a portal for other web sites) or the location or context of a domain name within a packet stream. The policies dictating whether domain names are of interest may be static (e.g., set by an administrator) or dynamic/adjustable.

If the method 300 determines that the domain name is not of interest (e.g., in accordance with the predefined policies), the method 300 returns to step 303 and continues to monitor packets. In one embodiment, if the method 300 determines that the domain name is of interest, the method 300 proceeds to step 306 and issues a local DNS request to a local DNS server in accordance with standard HTTP GET procedures. In one embodiment, the local DNS request (and all subsequent DNS requests) is a standard DNS request; however, in alternate embodiments, different protocols may be implemented.

At step 308, the method 300 inquires if the local DNS server has the desired IP address cached. If the method 300 determines that the local DNS server does have the desired IP address cached, the method 300 returns to step 303.

Alternatively, if the method 300 determines at step 308 that the local DNS server does not have the desired IP address cached, or if the local DNS server is not available, the method 300 proceeds to step 310 and issues a remote DNS request to the name server. The method 300 then determines, at step 312 based on the response, if the name server has an entry for the desired IP address. If there is an entry for the IP address at the name server, the method 300 advances to step 320 and sends the IP address to the local DNS server. In one embodiment, the IP address is also cached at the local DNS server in step 320. The method 300 then proceeds to step 303 as described above.

If the method 300 determines at step 312 that the name server does not have an entry for the desired IP address, the method 300 proceeds to step 314 and issues a DNS request to the next DNS server up from the name server in the server hierarchy. At step 316, the method 300 inquires if the desired IP address has an entry at the next server. If the method 300 determines at step 316 that the next DNS server does not have an entry for the desired IP address, the method 300 returns to step 314 and issues a request to the next DNS server in the hierarchy. Steps 314-316 are repeated until the request is issued to a DNS server that has the desired IP address. Once a DNS server that does have the desired IP address is contacted, the method 300 proceeds to step 318 and sends the IP address to the local DNS server. The method 300 then proceeds to step 303 as described above.

In one embodiment, local DNS requests and HTTP requests may be simultaneously issued from different clients. Moreover, local DNS requests may be issued as an HTTP response is received and rendered by a client. For example, in one embodiment, a user on a local network may issue a request to a web search engine and receive a page of results containing links to twenty different web sites. While the user's web browser renders the results page, each of the twenty domain names listed on the page is resolved via DNS according to the method described above. Thus, when the user clicks on a link for a particular web site, the domain name's IP address will already have been identified and cached at the local DNS server, thereby reducing connection time to the site.

Figure 4:
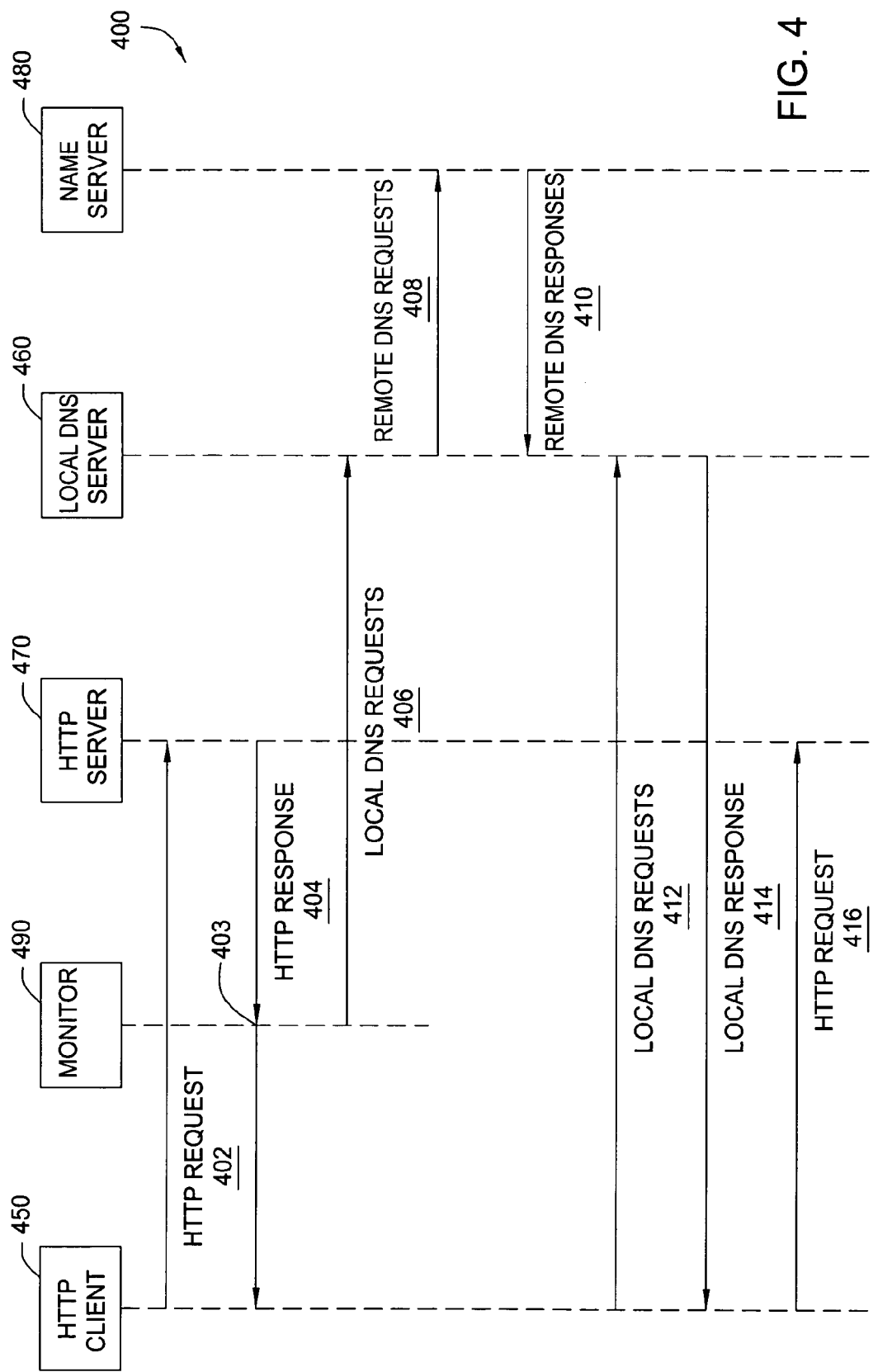
FIG. 4 is a sequence diagram illustrating a demonstrative DNS pre-fetch sequence, in accordance with the method illustrated in FIG. 3.

FIG. 4 is a sequence diagram illustrating a demonstrative DNS pre-fetch sequence 400 in accordance with the method 300 described above. At step 402, the sequence 400, having resolved a prior DNS request (not shown), issues an HTTP request to the remote HTTP server 470. At step 404, the sequence 400 issues a corresponding HTTP response. As illustrated, the sequence 400 monitors the incoming HTTP response at step 403, where the HTTP response is scanned by a packet monitor 490 (e.g., similar to the packet monitor 220 illustrated in FIG. 2). At step 406, the sequence 400 determines that a domain name in the incoming HTTP response is of interest, e.g., in accordance with predefined network policies, and issues a local DNS request to a local DNS server 460. If the IP address of the indicated domain name is not cached at the local DNS server 460, the sequence 400 issues a remote DNS request to a name server at step 408. At step 410, the sequence 400, having identified the IP address that corresponds to the indicated domain name, issues a remote DNS response to the local DNS server 460. At this point, the IP address is also cached at the local DNS server 460.

Thus, when the sequence 400 later requests the indicated domain name via a local DNS request in step 412, the IP address of the indicated domain name has already been cached at the local DNS server 460. The sequence 400 may then immediately issue a local DNS response to a requesting client 450 in step 414, rather than contact a remote server (e.g., name server 480) to resolve the DNS request. Thus, the time between the issuance of the local DNS request in step 412, and the issuance of an HTTP request in step 416, is significantly reduced.

Figure 5:
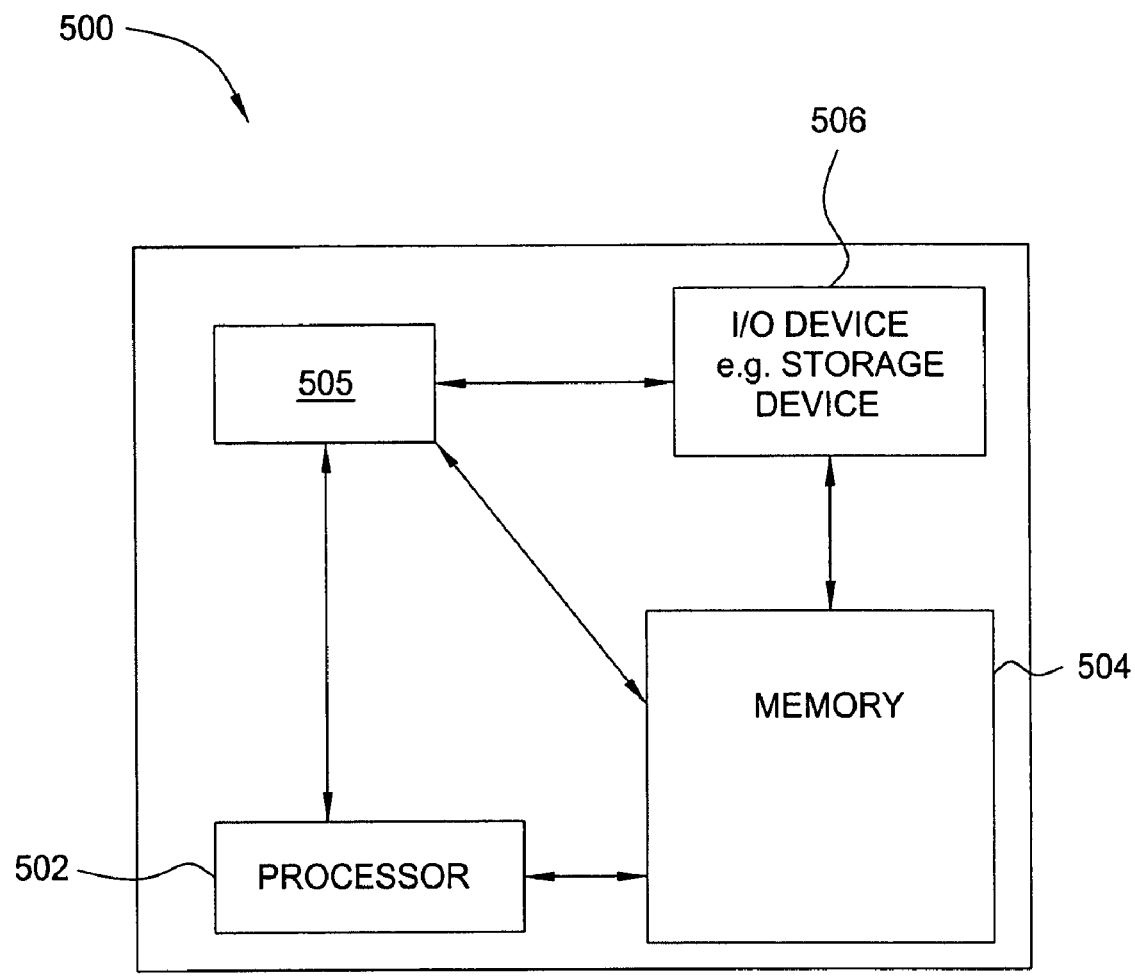
FIG. 5 is a high level block diagram of the present invention implemented using a general purpose computing device.

FIG. 5 is a high level block diagram of the present DNS pre-fetch system, implemented using a general purpose computing device 500. In one embodiment, a general purpose computing device 500 comprises a processor 502, a memory 504, a pre-fetch mechanism or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the pre-fetch mechanism 505 can be implemented as a physical device or subsystem that is coupled to a processor through a communication channel.

Alternatively, the pre-fetch mechanism 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the pre-fetch mechanism 505 for allocating resources among entities described herein with reference to the preceding figures can be stored on a computer readable medium or carrier (e.g., RAM, magnetic or optical drive or diskette, and the like).

Thus, the present invention represents a significant advancement in the field of network processing. A method and apparatus are provided that enable a local DNS server to quickly respond to client requests for particular domain names. Moreover, because corresponding IP addresses are cached at the local DNS server, any client connected to the local DNS server on the local network can be quickly connected to the indicated domain name, thereby allowing multiple clients to share pre-fetched DNS entries.

While foregoing is directed to the preferred embodiment of the present invention, other and further embodiments of the invention may be devised without departing from the basic scope thereof, and the scope thereof is determined by the claims that follow.

The invention claimed is:

1. A method for pre-fetching Domain Name System (DNS) entries, the method comprising the steps of:
   monitoring, by a dedicated packet monitor, data packets coming into or going out of a network;
   identifying, by the packet monitor and in accordance with one or more defined criteria, at least one domain name of interest in at least one of the data packets;
   determining, by the packet monitor, that a local DNS server has not cached an Internet Protocol (IP) address corresponding to the at least one domain name of interest, where the local DNS server serves a plurality of clients;
   retrieving, by the packet monitor, the IP address from a server other than the local DNS server; and
   sending, by the packet monitor, the IP address to the local DNS server.

2. The method of claim 1, wherein the criteria include the frequency of a domain name within a window of time or number of monitored data packets.

3. The method of claim 1, wherein the one or more defined criteria include the frequency or grouping of disparate domain names within a window of time or a number of data packets.

4. The method of claim 1, wherein the criteria include a transport layer identifier or endpoint.

5. The method of claim 1, wherein the criteria include a protocol being scanned.

6. The method of claim 1, wherein the criteria include an IP address of a client on the network.

7. The method of claim 1, wherein the criteria include an IP address of a server on the network.

8. The method of claim 1, wherein the criteria include a location or a context of a domain name within the monitored data packets.

9. The method of claim 1, wherein the criteria is static.

10. The method of claim 1, wherein the criteria is dynamic.

11. The method of claim 1, further comprising the step of:
    caching, by the local DNS server, the IP address.

12. The method of claim 1, wherein the step of retrieving the IP address is executed using a standard DNS protocol from DNS name servers.

13. A method for expediting domain name-to-IP address translation requests from multiple clients, the method comprising the steps of:
    monitoring, by a dedicated packet monitor, data packets coming into a network on which said multiple clients reside;
    retrieving, by the packet monitor, at least one Internet Protocol (IP) address of a domain name appearing in at least one of the data packets, in accordance with one or more predefined criteria that identify at least one domain name of interest;
    determining, by the packet monitor, that a local DNS server serving said muiltiple clients has not cached the at least one IP address;
    retrieving, by the packet monitor, the at least one IP address from a server other than the local DNS serve; and
    sending, by the packet monitor, the at least one IP address to the local DNS server.

14. The method of claim 13, further comprising the step of:
    caching the IP addresses at the local Domain Name System server.

* * * * *